(12) United States Patent
Wang et al.

(10) Patent No.: US 10,890,442 B1
(45) Date of Patent: Jan. 12, 2021

(54) STRUCTURED LIGHT PROJECTOR AND METHOD FOR STRUCTURED LIGHT PROJECTION USING THE SAME

(71) Applicant: HIMAX TECHNOLOGIES LIMITED, Tainan (TW)

(72) Inventors: Ching-Wen Wang, Tainan (TW); Cheng-Che Tsai, Tainan (TW); Wu-Feng Chen, Tainan (TW); Hsueh-Tsung Lu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 16/726,955

(22) Filed: Dec. 26, 2019

(51) Int. Cl.
*G01B 11/25* (2006.01)
*G02B 27/42* (2006.01)
*G03B 21/14* (2006.01)
*G06T 7/521* (2017.01)

(52) U.S. Cl.
CPC .......... *G01B 11/25* (2013.01); *G02B 27/4205* (2013.01); *G03B 21/14* (2013.01); *G06T 7/521* (2017.01)

(58) Field of Classification Search
None
See application file for complete search history.

(56) References Cited

U.S. PATENT DOCUMENTS

| 2007/0279365 A1* | 12/2007 | Kageyama | H04N 5/23212 345/100 |
| 2015/0103257 A1* | 4/2015 | Nakashin | H04N 9/3194 348/746 |

* cited by examiner

*Primary Examiner* — James A Dudek
(74) *Attorney, Agent, or Firm* — CKC & Partners Co., LLC

(57) ABSTRACT

A structured light projector and a method for structured light projection are disclosed. The structured light projector includes a projection module, a liquid crystal (LC) lens and a processor. The projection module is configured to project an optical pattern. The (LC) lens module is disposed over the projection module, and is configured to focus the optical pattern onto a region of space. The processor is configured to generate a control signal depending on an environment temperature of the projection module for controlling the LC lens.

15 Claims, 7 Drawing Sheets

| Temperature | Voltage+ | Voltage- |
|---|---|---|
| T1 | VP1 | VN1 |
| T2 | VP2 | VN2 |

FIG. 7

STRUCTURED LIGHT PROJECTOR AND METHOD FOR STRUCTURED LIGHT PROJECTION USING THE SAME

BACKGROUND

Technical Field

The invention relates to structured light projection, and more particularly to a structured light projector with a liquid crystal (LC) lens and a method for structured light projection using the same.

Description of Related Art

Structured light scanning is a technology to calculate the depths of a field of view. The depth of an object can be calculated by analyzing the captured image. On the other hand, a conventional structured light projector usually produces a special speckle optical pattern by using an infrared laser source to combine the diffractive optical elements. However, the wavelength of the optical pattern generated by a conventional laser element would change due to different temperatures, so that projected speckles of the optical pattern projected onto a region of space expand opposite the center of the region of space after passing through a diffractive optical element (DOE). For a structured light 3D sensor that uses deformation displacements to calculate depth information, the speckles expansion would result in tilt deviation in depth measurement results.

SUMMARY

One objective of the invention is to provide a structured light projector with a liquid crystal (LC) lens of which the equivalent curvature may be adjusted for compensating the expansion of projected speckles due to temperature variation, so as to obtain the depth information of an object more accurately. Another objective of the invention is to provide a method for structured light projection using the structured light projector.

One aspect of the invention relates to a structured light projector which includes a projection module, an LC lens and a processor. The projection module is configured to project an optical pattern. The LC lens is disposed over the projection module, and is configured to focus the optical pattern onto a region of space. The processor is configured to generate a control signal depending on an environment temperature of the projection module for controlling the LC lens.

In one or more embodiments, the structured light projector further includes a temperature sensor that is configured to detect the environment temperature of the projection module.

In one or more embodiments, the structured light projector further includes an image sensor that is configured to detect the optical pattern onto the region of space.

In one or more embodiments, the image sensor is an infrared sensor.

In one or more embodiments, the processor generates the control signal depending on the environment temperature of the projection module and the optical pattern onto the region of space for controlling the LC lens.

In one or more embodiments, the structured light projector further includes a memory for storing a look-up table with mapping information between temperature values and control signal values.

In one or more embodiments, the projection module includes a light source and a diffractive optical element (DOE). The light source is configured to generate a light beam. The DOE is configured to convert the light beam into the optical pattern.

In one or more embodiments, the light source is an infrared laser source.

In one or more embodiments, storage capacitances in the LC lens are charged before the light source is triggered for each frame period.

In one or more embodiments, storage capacitances in the LC lens are charged after the light source stops emitting light for each frame period.

In one or more embodiments, the structured light projector further includes a wafer-level optics (WLO) that is interposed between the light source and the DOE.

In one or more embodiments, the structured light projector further includes an LC lens driver electrically connected to the LC lens and the processor. The LC lens driver is configured to change an equivalent curvature of the LC lens based on the control signal.

In one or more embodiments, the processor is configured to communicate with the LC lens driver through an inter integrated circuit (I2C) interface.

In one or more embodiments, the processor is configured to communicate with the projection module through an I2C interface.

In one or more embodiments, wherein the processor is configured to communicate with the image sensor through an I2C interface.

Another aspect of the invention relates to a method for structured light projection. The method includes providing a projection module to project an optical pattern; utilizing an LC lens over the projection module to focus optical pattern onto a region of space; and generating a control signal depending on an environment temperature of the projection module for controlling the LC lens.

BRIEF DESCRIPTION OF THE DRAWINGS

Embodiments and advantages thereof can be more fully understood by reading the following description with reference made to the accompanying drawings as follows:

FIG. 7 illustrates a look-up table stored in accordance with one exemplarily example.

DETAILED DESCRIPTION

Figure 1:
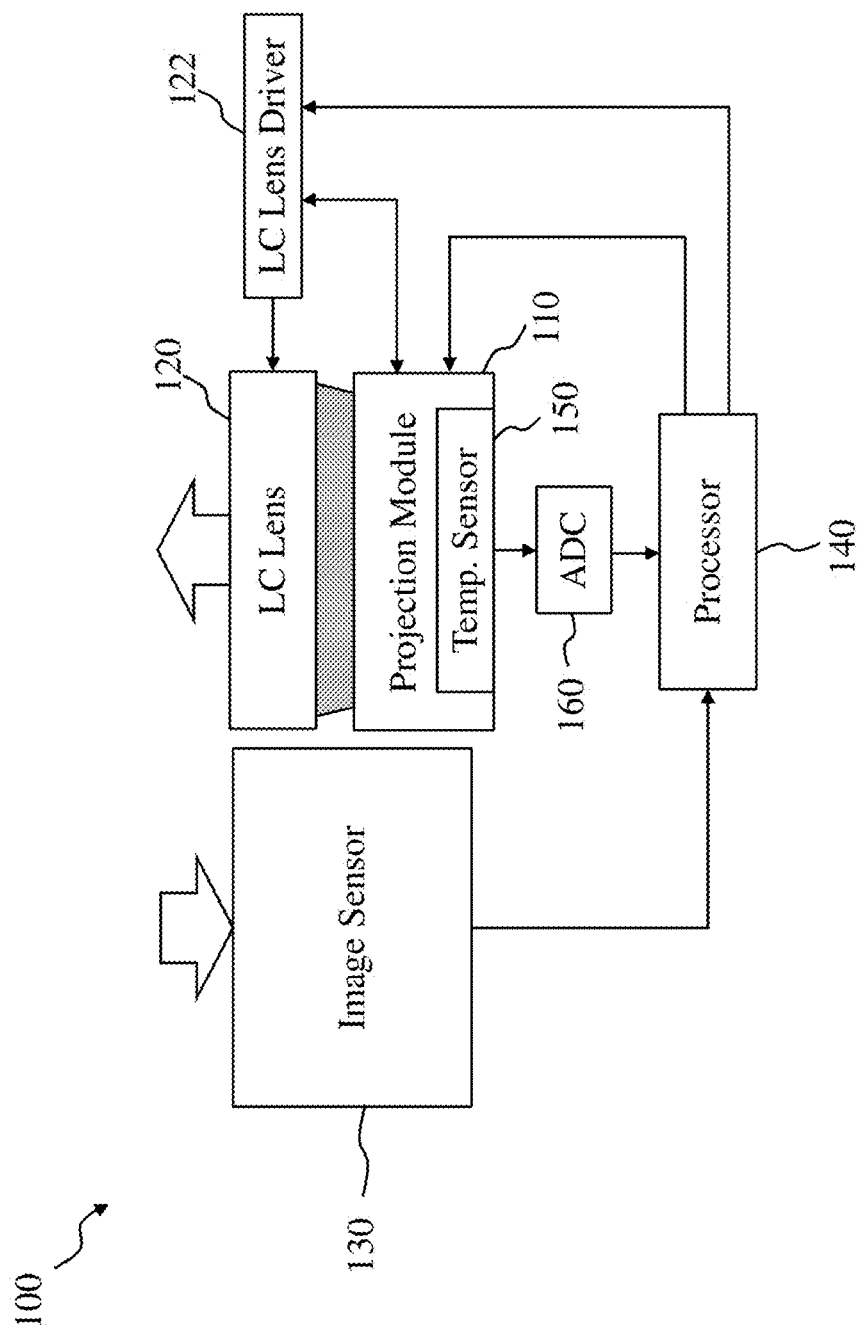
FIG. 1 is schematic diagram of a structured light projector in accordance with one embodiment of the invention.

The spirit of the disclosure is clearly described hereinafter accompanying with the drawings and detailed descriptions.

After realizing preferred embodiments of the disclosure, any persons having ordinary skill in the art may make various modifications and changes according to the techniques taught in the disclosure without departing from the spirit and scope of the disclosure.

Terms used herein are only used to describe the specific embodiments, which are not used to limit the claims appended herewith. Unless limited otherwise, the term "a," "an," "one" or "the" of the single form may also represent the plural form. Further, the spatially relative terms are intended to encompass different orientations of the device in use or operation in addition to the orientation depicted in the figures. The device may be otherwise oriented (rotated 90 degrees or at other orientations) and the spatially relative descriptors used herein may likewise be interpreted accordingly.

The document may repeat reference numerals and/or letters in the various examples. This repetition is for the purpose of simplicity and clarity and does not in itself dictate a relationship between the various embodiments and/or configurations discussed.

FIG. 1 is schematic diagram illustrating a structured light projector 100 in accordance with one embodiment of the invention. As shown in FIG. 1, the structured light projector 100 includes a projection module 110, a liquid crystal (LC) lens 120, an LC lens driver 122, an image sensor 130, and a processor 140 that is electrically connected to the projection module 110, the LC lens driver 122 and the image sensor 130.

The projection module 110 is configured to project an optical pattern which may include one or plural dots and/or lines, but the invention is not limited thereto. The LC lens 120 is disposed over the projection module 110, and is configured to focus the optical pattern onto a region of space, such as an appearance of an object or the like. The voltages respectively applied on two opposite electrodes (not shown) of the LC lens 120 may be changed based on the signal from the LC lens driver 122, so as to adjust the equivalent curvature thereof. The projection module 110 and the LC lens driver 122 may perform a synchronization process with each other for correctly projecting optical patterns at corresponding times.

The image sensor 130 is configured to detect the optical pattern onto the region of space for capturing an image corresponding to the optical pattern. The image sensor 130 may be a charge-coupled device (CCD) sensor, a complementary metal-oxide semiconductor (CMOS) sensor, or the like.

The processor 140 is configured to control the projection module 110 and the LC lens driver 122. Particularly, the processor 140 transmits a first control signal to the projection module 110 for controlling the projection module 110 to project a desired optical pattern, and transmits a second control signal to the LC lens driver 122 for controlling the LC lens 120 to adjust the traveling directions of light components and focus the optical pattern onto a region of space. The processor 140 may dynamically control the projection module 110 and the LC lens driver 122 depending on the captured image from the image sensor 130. The processor 140 may communicate with the projection module 110, the LC lens driver 122 and/or the image sensor 130 through one or more inter integrated circuit (I2C) interfaces, but the invention is not limited thereto. The processor 140 may be a central processing unit (CPU), a microprocessor, a microcontroller, a digital signal processor, an image processing chip, an application-specific integrated circuit, or the like.

The structured light projector 100 also includes a temperature sensor 150 that is configured to detect an environment temperature of the projection module 110. The temperature sensor 150 may be embedded in the projection module 110 for accurately obtaining the environment temperature.

The structured light projector 100 also includes an analog-to-digital converter (ADC) 160 that is electrically connected to the processor 140 and the temperature sensor 150. The ADC 160 is configured to convert the temperature signal corresponding to the environment temperature detected by the temperature sensor 150 from analog to digital.

Figure 2:
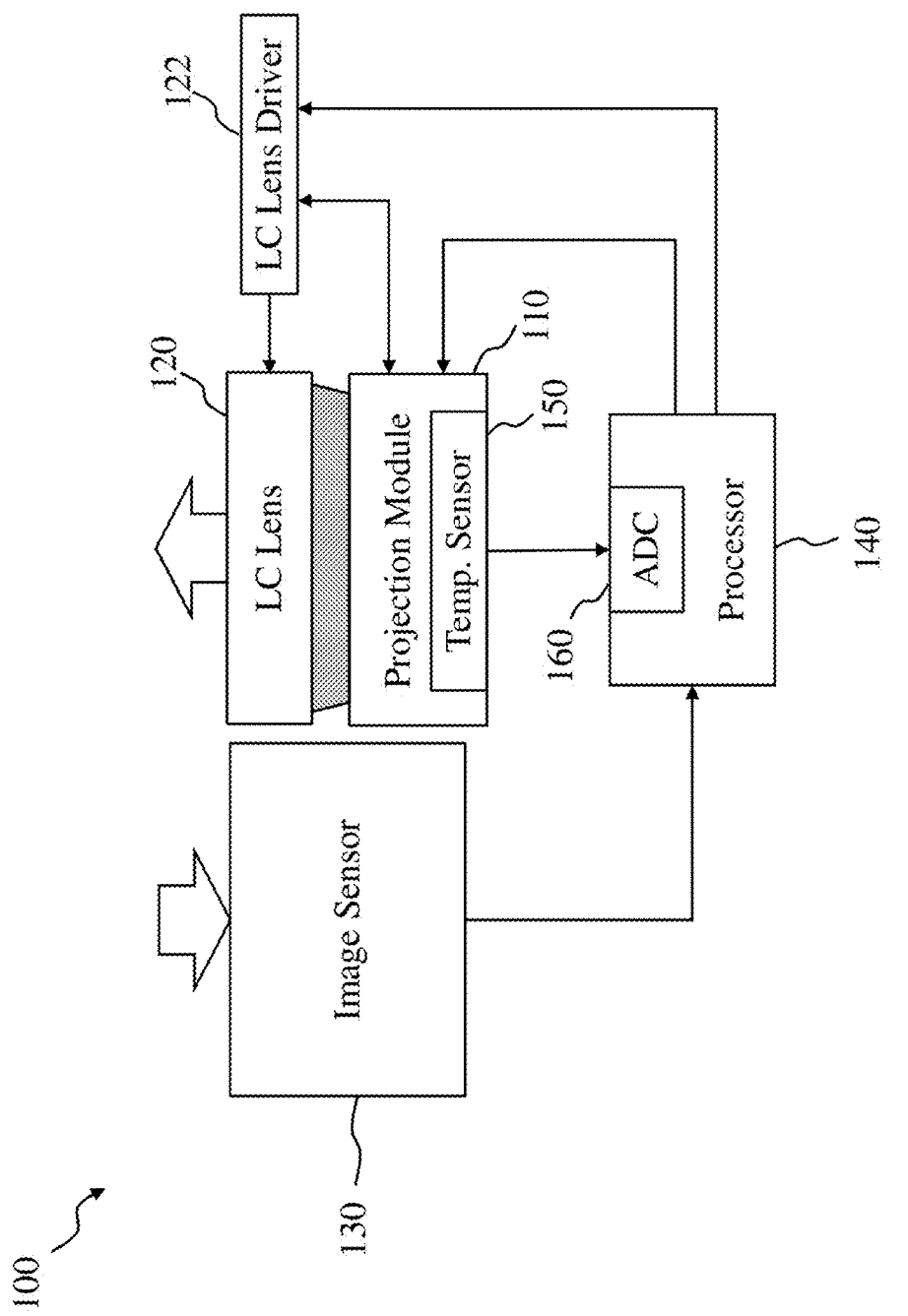
FIG. 2 is schematic diagram of a structured light projector in accordance with another embodiment of the invention.

FIG. 2 is schematic diagram illustrating a structured light projector 100 in accordance with another embodiment of the invention. In FIG. 2, the ADC 160 is physically separated from the processor 140, i.e., not embedded in the processor 140. The other components are the same as those shown in FIG. 1, and thus the detailed description is not repeated herein.

Figure 3:
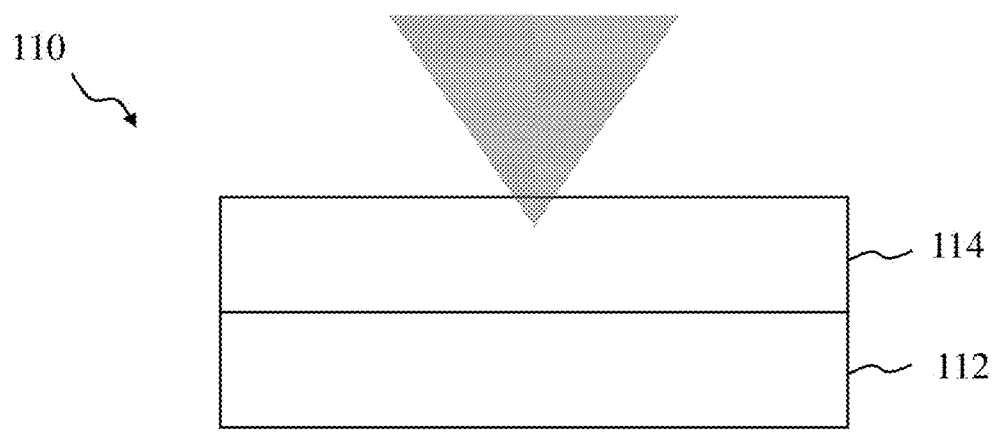
FIG. 3 is schematic diagram of the projection module of the structured light projector in FIG. 1 in accordance with one exemplarily example.

FIG. 3 is schematic diagram of the projection module 110 in accordance with one exemplarily example. As shown in FIG. 3, the projection module 110 includes a light source 112 and a diffractive optical element (DOE) 114. The light source 112 is configured to generate a light beam. The light source 112 may be a laser source, such as vertical cavity surface emitting laser (VCSEL), a distributed feedback (DFB) semiconductor laser, or another suitable laser source. The light beam emitted by the light source 112 may be a near-infrared light beam of which the wavelength is in a range from about 700 nm to about 1000 nm. In other embodiments, the light beam emitted by the light source 112 may also be visible, or alternatively the wavelength of the light beam emitted by the light source 112 is in a visible range of about 400-700 nm. The DOE 114 is disposed over the light source 112 for converting the light beam into the optical pattern. In particular, the DOE 114 has a grating structure, such that when the light beam passes through the DOE 114, the light beam is converted to the optical pattern by the diffraction principle of the grating structure.

Figure 4:
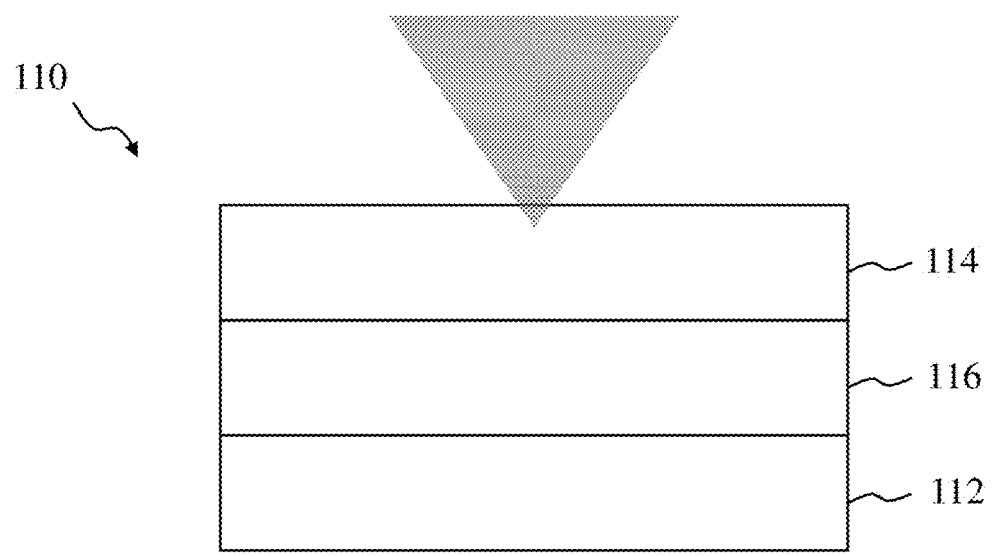
FIG. 4 is schematic diagram of the projection module of the structured light projector in FIG. 1 in accordance with another exemplarily example.

FIG. 4 is schematic diagram of the projection module 110 in accordance with another exemplarily example. In comparison with the projection module 110 shown in FIG. 3, in FIG. 4, the projection module 110 further has a wafer-level optics (WLO) 116 that is interposed between the light source 112 and the DOE 114. The WLO 116 may include one or more substrates on which a beam homogenizer and a collection lens are formed; the beam homogenizer is configured to enlarge the cross-sectional area of the light beam, so that the cross-sectional area of the light beam can cover the following components, while the collection lens is configured to collimate the light beam into parallel light and directs the light beam in a substantially parallel fashion. The other components are the same as those shown in FIG. 3, and thus the detailed description is not repeated herein.

It is noted that FIGS. 3 and 4 are merely examples of the projection module 110. The components of the projection module 110 may have another arrangement in other embodiments. For example, one or more components of the projection module 110 may be omitted or arranged in a different sequence. In addition, the collection lens of the WLO 116 may be a convex lens, a concave lens, a combination thereof, or another suitable lens. In some embodiments, a further projection lens (not shown) may be disposed over the DOE 114 for directing the optical pattern towards the LC lens 120.

Figure 5:
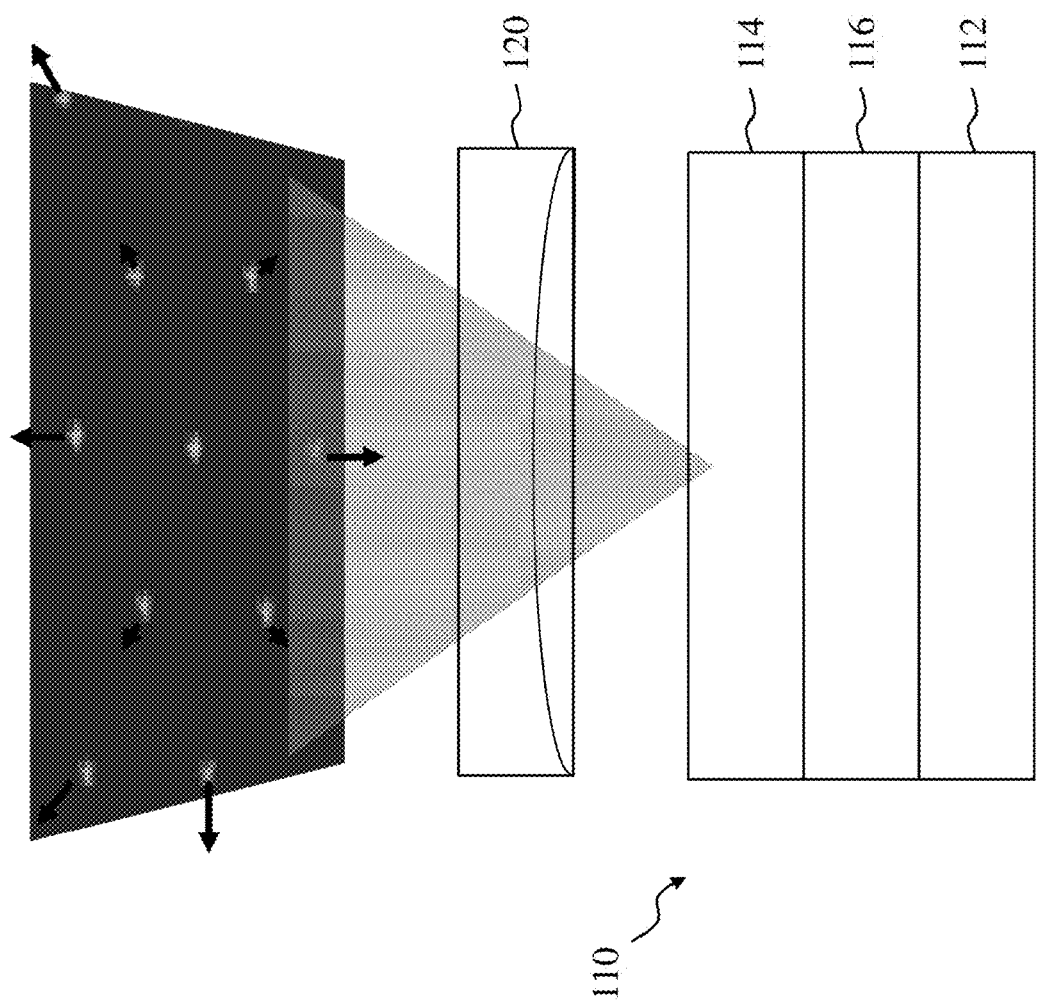
FIG. 5 illustratively shows a tilting deviation of projected spots due to temperature change.

FIG. 5 illustratively shows tilting deviation of projected speckles due to temperature change. As shown in FIG. 5, speckles of the optical pattern are projected onto the region of space; if the temperature of the light source 112 changes (e.g. rises), the projected speckles expand opposite to the center of the region of space, which would cause a tilting deviation for a depth measurement.

Figure 6:
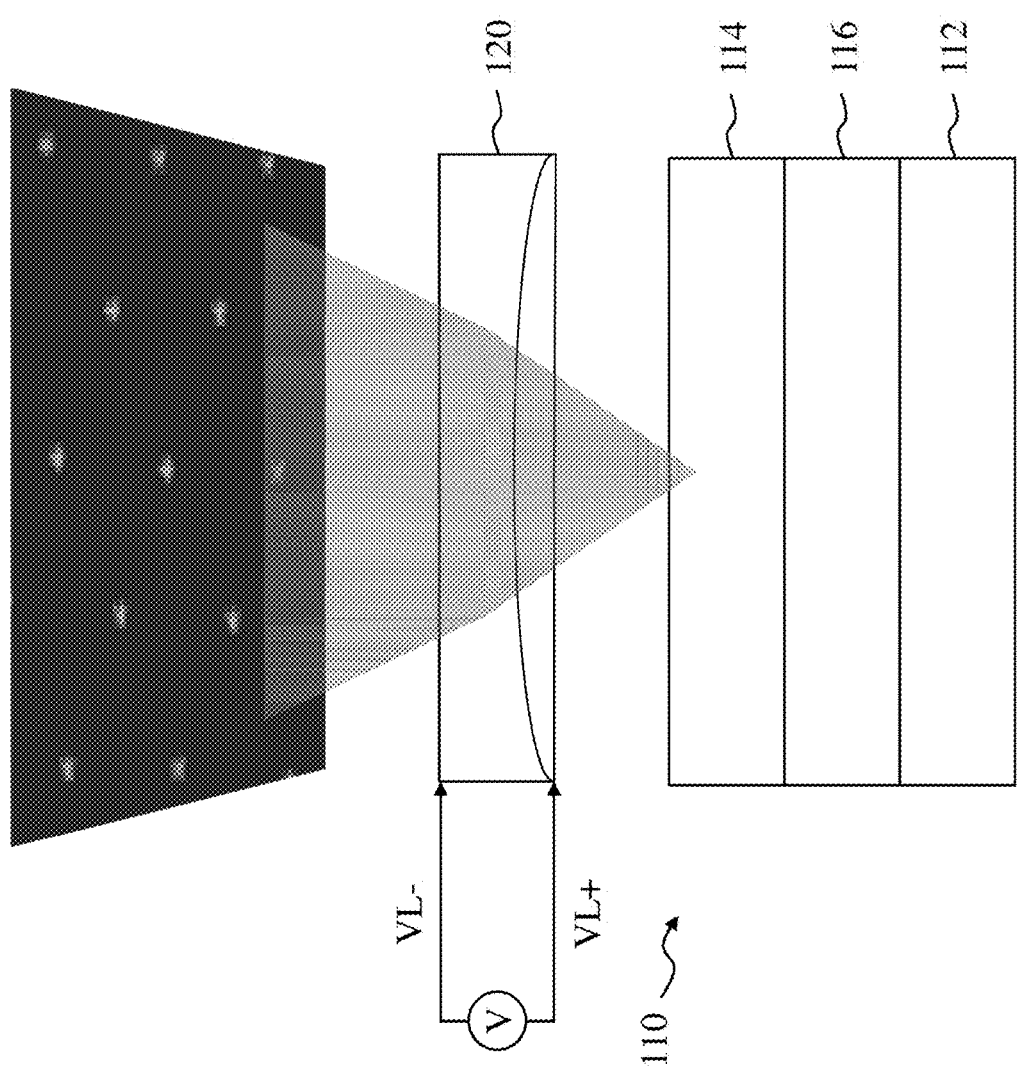
FIG. 6 illustratively shows compensation for the tilting deviation shown in FIG. 5.

FIG. 6 illustratively shows compensation for the tilting deviation shown in FIG. 5. As shown in FIG. 6, when the voltages VL+ and VL− are respectively applied on the opposite electrodes of the LC lens 120 by the control of the LC lens driver 122, the equivalent curvature of the LC lens 120 changes for compensating the expansion of the projected speckles, so as to obtain the depth information more accurately.

FIG. 7 illustrates a look-up table stored in accordance with one exemplarily example. The look-up table may be stored in a memory that may be embedded in the processor 140 or may be disposed external to the processor 140. As shown in FIG. 7, the temperature information of the projection module 110 is associated with the voltage+ information and the voltage− information for the LC lens 120. If the temperature sensor 150 detects that the environment temperature is T1, the processor 140 refers to the look-up table and then transmits a control signal with the voltage+ information VP1 and the voltage− information VN1 to the LC lens driver 122, and then the LC lens driver 122 controls the LC lens 120 by applying the voltages VL+ and VL− corresponding to the voltage+ information VP1 and the voltage− information VN1 respectively on the two opposite electrodes of the LC lens 120; If the temperature sensor 150 detects that the environment temperature is T2, the processor 140 refers to the look-up table and then transmits the control signal CTRL with the voltage+ information VP2 and the voltage− information VN2 to the LC lens driver 122, and then the voltages VL+ and VL− are changed to respectively correspond to the voltage+ information VP2 and the voltage− information VN2 by the LC lens driver 122. The look-up table may be predetermined by characterizing the temperature information of the projection module 110 with the voltage+ information and the voltage− information respectively corresponding to the two opposite electrodes of the LC lens 120. It is noted that the look-up table shown in FIG. 7 are merely an exemplary example, and therefore the size and the contents thereof does not constitute any limitation to the invention.

Figure 8:
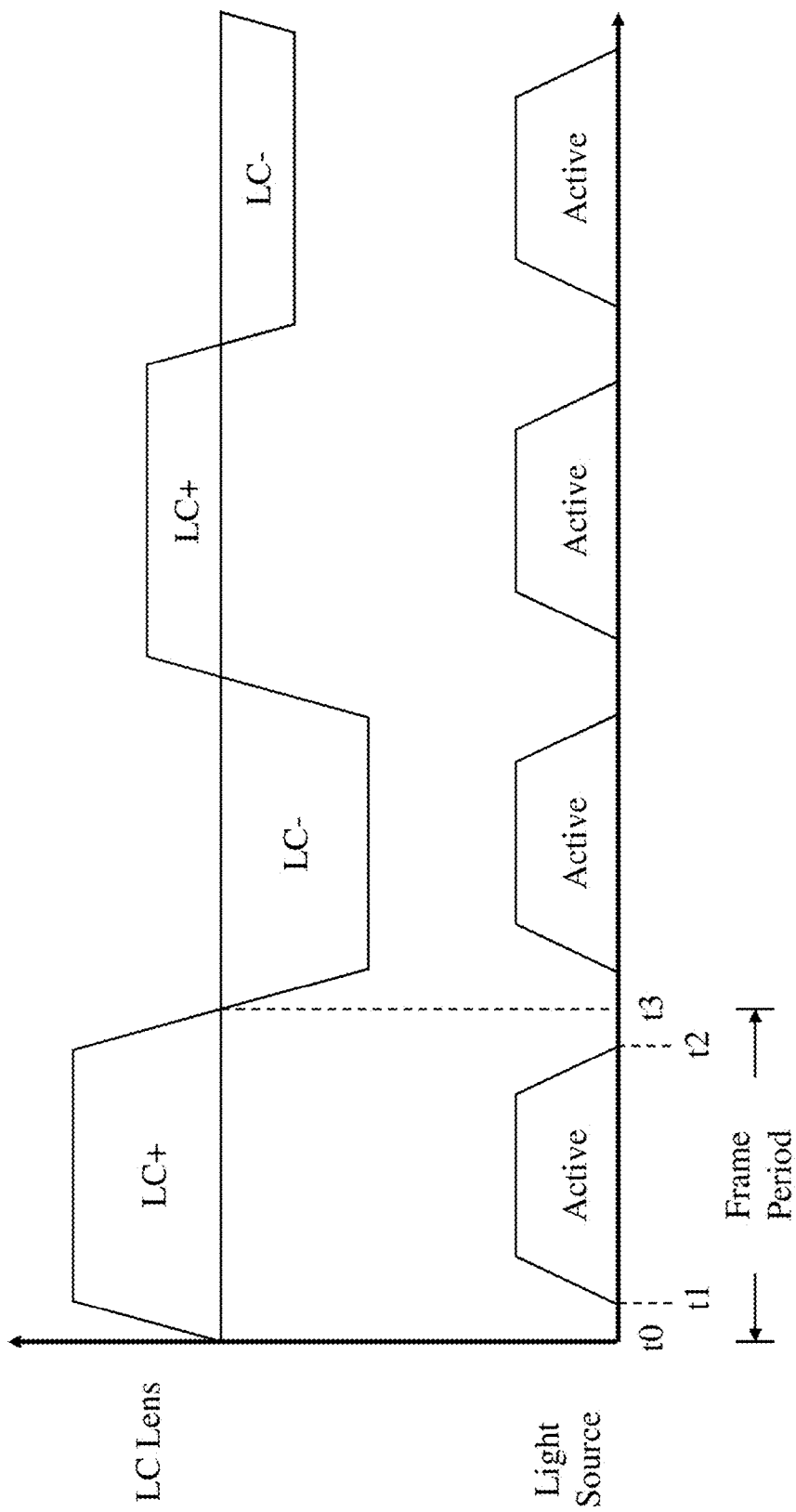
FIG. 8 exemplarily shows the activation status of the light source and the polarity status of the LC lens shown in FIG. 6.

FIG. 8 exemplarily shows the activation status of the light source 112 and the polarity status of the LC lens 120 shown in FIG. 6. As shown in FIG. 8, for each frame period, the light source 112 is triggered to generate a light beam, and LC lens 120 has a positive polarity (labeled as "LC+") or a negative polarity (labeled as "LC−"). Because the LC molecules in the LC lens 120 generally have a nonzero response time, the storage capacitances in the LC lens 120 are charged before the light source 112 is triggered for each frame period. For example, in the first frame period shown in FIG. 8, the storage capacitances in the LC lens 120 (i.e. between the opposite electrodes of the LC lens 120) are charged at time t0, and the light source 112 is active to emit light at time t1 after time t0; the light source 112 stops emitting light at time t2, and the storage capacitances in the LC lens 120 are discharged at time t3 after time t2. In addition, the polarity of the LC lens 120 may be changed when entering the next frame period, and the equivalent curvature of the LC lens may be changed depending on the voltages VL+ and VL− applied on the opposite electrodes of the LC lens 120. In another embodiment, the polarity of the LC lens 120 may be changed per plural frame periods.

Summing the above, the structured light projector in accordance with the embodiments of the invention can compensate the expansion of projected speckles due to temperature variation by adjusting the equivalent curvature of the LC lens, so as to obtain the depth information of an object more accurately.

Although the invention is described above by means of the implementation manners, the above description is not intended to limit the invention. A person of ordinary skill in the art can make various variations and modifications without departing from the spirit and scope of the invention, and therefore, the protection scope of the invention is as defined in the appended claims.

What is claimed is:

1. A structured light projector, comprising:
    a projection module configured to project an optical pattern, the projection module comprising:
        a light source configured to generate a light beam; and
        a diffractive optical element (DOE) configured to convert the light beam into the optical pattern;
    a liquid crystal (LC) lens disposed over the projection module, the LC lens configured to focus the optical pattern onto a region of space; and
    a processor configured to generate a control signal depending on an environment temperature of the projection module for controlling the LC lens.

2. The structured light projector of claim 1, further comprising:
    a temperature sensor configured to detect the environment temperature of the projection module.

3. The structured light projector of claim 1, further comprising:
    an image sensor configured to detect the optical pattern onto the region of space.

4. The structured light projector of claim 3, wherein the image sensor is an infrared sensor.

5. The structured light projector of claim 1, wherein the processor generates the control signal depending on the environment temperature of the projection module and the optical pattern onto the region of space for controlling the LC lens.

6. The structured light projector of claim 1, further comprising:
    a memory for storing a look-up table with mapping information between temperature values and control signal values.

7. The structured light projector of claim 1, wherein the light source is an infrared laser source.

8. The structured light projector of claim 1, wherein storage capacitances in the LC lens are charged before the light source is triggered for each frame period.

9. The structured light projector of claim 1, wherein storage capacitances in the LC lens are discharged after the light source stops emitting light for each frame period.

10. The structured light projector of claim 1, further comprising:
    a wafer-level optics (WLO) interposed between the light source and the DOE.

11. The structured light projector of claim 1, further comprising:
    an LC lens driver electrically connected to the LC lens and the processor, the LC lens driver configured to change an equivalent curvature of the LC lens based on the control signal.

12. The structured light projector of claim 11, wherein the processor is configured to communicate with the LC lens driver through an inter integrated circuit (I2C) interface.

13. The structured light projector of claim 1, wherein the processor is configured to communicate with the projection module through an I2C interface.

14. The structured light projector of claim 1, wherein the processor is configured to communicate with the image sensor through an I2C interface.

15. A method for structured light projection, comprising:
generating a light beam by a light source;
converting the light beam into an optical pattern by a diffractive optical element (DOE);
utilizing a liquid crystal (LC) lens over the projection module to focus optical pattern onto a region of space; and
generating a control signal depending on an environment temperature of the projection module for controlling the LC lens.

* * * * *